US011132452B2

(12) United States Patent
Nadler (10) Patent No.: US 11,132,452 B2
(45) Date of Patent: Sep. 28, 2021

(54) DATA-ENCRYPTION-BASED PURPOSE-SPECIFIC ACCESS CONTROL

(71) Applicant: International Business Machines Corporation, Armonk, NY (US)

(72) Inventor: Sima Nadler, Kochav Yair (IL)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/191,490

(22) Filed: Nov. 15, 2018

(65) Prior Publication Data

US 2020/0159942 A1    May 21, 2020

(51) Int. Cl.
*G06F 21/00*    (2013.01)
*G06F 21/62*    (2013.01)
*H04L 9/32*    (2006.01)
*H04L 29/06*    (2006.01)

(52) U.S. Cl.
CPC ........ *G06F 21/6209* (2013.01); *H04L 9/3263* (2013.01); *H04L 63/107* (2013.01); *H04L 63/0281* (2013.01)

(58) Field of Classification Search
CPC .......................... G06F 21/6209; H04L 9/3263
USPC ......................................................... 713/193
See application file for complete search history.

(56) References Cited

U.S. PATENT DOCUMENTS

| | | | |
|---|---|---|---|
| 8,275,632 B2 | 9/2012 | Awaraji et al. | |
| 8,904,503 B2 | 12/2014 | Agbabian | |
| 9,547,720 B2 | 1/2017 | Hang et al. | |
| 9,769,124 B2 | 9/2017 | Yan | |
| 2012/0173881 A1* | 7/2012 | Trotter | H04L 9/0894 713/189 |
| 2018/0020001 A1* | 1/2018 | White | G06F 21/604 |

OTHER PUBLICATIONS

Pietro Colombo et al., "Privacy Aware Access Control for Big Data: A Research Roadmap", Big Data Research, 2015, vol. 2, Issue 4, pp. 145-154.
David W. Chadwick et al., "A privacy preserving authorisation system for the cloud", Journal of Computer and System Sciences, 2012, vol. 78, Issue 5, pp. 1359-1373.
Riccardo De Masellis et al., "A Declarative Framework for Specifying and Enforcing Purpose-Aware Policies", STM 2015 Proceedings of the 11th International Workshop on Security and Trust Management, 2015, vol. 9331 pp. 55-71.

(Continued)

*Primary Examiner* — Anthony D Brown
(74) *Attorney, Agent, or Firm* — Ziv Glazberg (57) ABSTRACT

A method, apparatus and product for data-encryption-based purpose-specific access control. The method comprising: having data of a subject, wherein an approval for usage of the data for a purpose is provided; obtaining an encryption key associated with the purpose, wherein a decryption key is required for decrypting information encrypted with the encryption key; encrypting the data using the encryption key, whereby obtaining purpose-based encrypted data that is encoded with the purpose for which the data can be used; and enabling access to the purpose-based encrypted data to one or more data consumers, whereby access to the data is obtainable by decrypting the purpose-based encrypted data using the decryption key that is available to data consumers that are certified for the purpose.

18 Claims, 5 Drawing Sheets

(56) References Cited

OTHER PUBLICATIONS

Amirreza Masoumzadeh et al., "PuRBAC: Purpose-Aware Role-Based Access Control", On the Move to Meaningful Internet Systems: OTM 2008, 2008, pp. 1104-1121.
Ji-Won Byun et al., "Purpose based access control of complex data for privacy protection", Proceedings of the tenth ACM symposium on Access control models and technologies, 2005, pp. 102-110.
Thomas Szyrkowiec et al., "First Demonstration of an Automatic Multilayer Intent-Based Secure Service Creation by an Open Source SDN Orchestrator", 42nd European Conference and Exhibition on Optical Communications, Sep. 18-22, 2016, pp. 31-33.

* cited by examiner

DATA-ENCRYPTION-BASED PURPOSE-SPECIFIC ACCESS CONTROL

TECHNICAL FIELD

The present disclosure relates to data protection in general, and to control and management of data access in accordance with authorized usage purposes, in particular.

BACKGROUND

In a myriad of practical applications and daily life scenarios, privileged information may be collected, stored, transferred, and used, thus giving rise to various data protection or privacy concerns. The privileged information may be, for example, personal information allowing either on its own or together with other information to identify or locate a single person or individual in context, or otherwise sensitive information, such as medical or financial data, the subject thereof may wish to keep confidential. With the advent of the so-called information highway and ubiquity of technologies such as the Internet-of-Things (IoT), wearable sensor systems and likewise network connectivity enabled devices, it may be more and more often the case where private data is generated at one location and transferred to another location, or even to a different entity, for processing or further usage. For example, a glucose monitor may track blood sugar level of a patient and transmit the measured values to a health center for supervision and care, or an in-vehicle computer may relay telemetry signals to a remote traffic management system for enhancing route planning and driver safety. There is thus a growing concern and risk that private data will be subject to unauthorized use, such as by an unauthorized third party, or for unauthorized purposes, even by a same entity which may acquire authorized access to the data for a declared purpose, yet may then exploit it for other unrelated ones.

BRIEF SUMMARY

One exemplary embodiment of the disclosed subject matter is a method comprising: having data of a subject, obtaining an encryption key associated with the purpose, encrypting the data using the encryption key, enabling access to the purpose-based encrypted data to one or more data consumers.

Another exemplary embodiment of the disclosed subject matter is a method comprising: obtaining a purpose-based encrypted data that encrypts data decrypting the purpose-based encrypted data using a decryption key that is associated with the purpose and using the data by a data consumer.

Yet another exemplary embodiment of the disclosed subject matter is a computerized apparatus having a processor and coupled memory, the processor being adapted to perform: having data of a subject, wherein an approval for usage of the data for a purpose is provided; obtaining an encryption key associated with the purpose, wherein a decryption key is required for decrypting information encrypted with the encryption key; encrypting the data using the encryption key, whereby obtaining purpose-based encrypted data that is encoded with the purpose for which the data can be used; enabling access to the purpose-based encrypted data to one or more data consumers, whereby access to the data is obtainable by decrypting the purpose-based encrypted data using the decryption key that is available to data consumers that are certified for the purpose.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to protect data from unauthorized access or use. A subject of the data or legal or enterprise policies may specify (1) for what purpose it is permitted to use the data, (2) which entities (data consumers) are permitted to use the data, or (3) for which combination of purpose and entity (data consumer) the data may be used. Access by an unauthorized entity or usage for an unauthorized purpose should be prevented. For example, a patient may authorize use of data acquired by a glucose monitor for a medical purpose, e.g. treatment of diabetes, but not for a commercial purpose, such as targeted advertising to purchase insulin products, or the like. Similarly, a mobile phone user may consent that geo-location data be collected and used by navigational services but not by advertising services, for insurance policy monitoring, for law enforcement, or the like. Similarly, data usage policies or laws may dictate for what purposes personal data may be used.

Additionally, or alternatively, further restriction may be associated with confidence level in the privacy compliance of the data consumer, the geographical location of the data consumer, or the like.

Yet another technical problem is to enable data access by trusted software that is executed on untrusted machines, or using untrusted third-party software.

Yet another technical problem dealt with by the disclosed subject matter is to conserve computing and storage resources involved in enforcement of data protection and authorized use policy.

One technical solution is to employ purpose-based data encryption and decryption, and provide access to the data for an authorized purpose in encrypted form, such that it can be decrypted only by actors presumed as being compliant with the authorized usage purpose.

Another technical solution is to employ a combined purpose and entity ID (data consumer) based data encryption and decryption, and provide access to the data for the specific data consumer only for the specific purpose.

In some exemplary embodiments, distribution of purpose-based encryption and decryption keys, as well as establishment and management of suitable purpose taxonomy and registry, may be performed by a specialized regulatory actor, referred to herein as a Purpose Certification Authority (PCA), which may utilize a PCA module. For example, for each recognized data usage purpose, the PCA module may generate and maintain a tuple (Purpose_ID, Purpose_Enc_Key, Purpose_Dec_Key), wherein Purpose_ID uniquely identifies the purpose (e.g., an assigned serial number or code), Purpose_Enc_Key serves to encrypt information the use of which is intended to be limited to that purpose only, and Purpose_Dec_Key serves to decrypt information encrypted with Purpose_Enc_Key. In particular, only an entity in possession of Purpose_Dec_Key may be able to decrypt the encrypted information encrypted with Purpose_Enc_Key.

In some exemplary embodiments, the purpose-based encryption and decryption keys, Purpose_Enc_Key and Purpose_Dec_Key, may be a public-private key pair in an asymmetrical cryptographic system, such as the public key cryptography schemes of RSA, ElGamal, or the like. In the context of the present disclosure, an encryption key may also be referred to interchangeably as a public key, and, similarly, a decryption key may also be referred to interchangeably as a private key.

In some exemplary embodiments, the PCA may certify and monitor compliance of actors with a data usage policy. The PCA may manage a plurality of registered entities, one or more of which being data providers and the other being data processors. The PCA module may maintain a public key and a private key for each authorized purpose. The PCA module may distribute the purpose-associated public keys to the data providers, so as to allow a data provider to encrypt purpose-specific information using the purpose's public key, and may grant data processors with a key for decrypting the information for the specified purpose, i.e. the purpose's private key, where the PCA module may be able to ensure that a data processor granted with the private key uses the decrypted information for the specified purpose only. The certification and enforcement of purpose compliance of the data processors by the PCA may be performed similarly as described in U.S. patent application Ser. No. 15/276,815, entitled "Digital certificate for verifying application purpose of data usage", filed on Sep. 27, 2016 and/or in U.S. patent application Ser. No. 15/397,753, entitled "Purpose-Based Control of Data Used by Computer Software Applications", filed on Jan. 4, 2017, both of which are hereby incorporated by reference in their entirety without giving rise to disavowment.

In some exemplary embodiments, each data processor may be provided with its own individual public-private key pair, allowing to encrypt information so that only the data processor may decrypt it. The PCA module may use the data processor's own public key to encrypt a purpose's private key granted thereto, so as to avoid misappropriation of the private key by unauthorized entities. The PCA module may be in charge of generation, distribution and management of individual keys, purpose keys, or the like. The PCA module may also manage expiry of keys and distribution of new keys, for example if a processing entity has been found to be in breach, thus preventing the use of personal data for a particular purpose.

In some exemplary embodiments, authorization of using data for a specific purpose may be granted together with additional conjunctive restrictions. For example, the authorization may be restricted for a specific data consumer in addition to the requirement that the data be used for a specific purpose. In order of enforcing such restrictions, a compound key, comprised of both the data processor's own public key and the purpose's public key, may be used to encrypt information aimed at the data processor for this use.

A "box in a box" encryption approach may be applied accordingly, wherein information may be encrypted first with the purpose public key, and then re-encrypted with the data processor's own public key. Additional conjunctive restrictions may be utilized in addition to, or instead of, the authorization of a specific data consumer. For example, the conjunctive restriction may be a restriction that the data consumer was ranked with a score above a minimal threshold. Each data consumer may be ranked according to how well it complies with privacy requirements, or privacy-friendly its privacy policies are, or the like. For example, each data consumer may be scored by the PCA with a score between 0 and 1. The usage of the data may be restricted to a data consumer having a score of at least 0.6. A compound key based on the purpose-based key and based on an encryption key associated with the 0.6 minimal threshold may be used for encrypting the data. The data consumer having a score of 0.6 or more may have access to a decryption key associated with the 0.6 minimal threshold and may use it in order to decrypt the data, if it is certified for the authorized purpose. As yet another example, the conjunctive restriction may be a restriction on the geographic location where the data is being used. A user may wish to prevent entities in China from gaining access to his private data. As another example, an organizational policy may restrict use of private data exclusively to the United States of America. Such restriction may be represented by utilizing a compound key that is based on the purpose-based key and the geographic-location based key. During decryption, the PCA may determine the geographic location of the data consumer, such as using a GPS module, determining geo-location of IP address, or the like, and determine whether or not to provide it with access to a suitable decryption key. In some cases, the geographic location of the data provider may be the physical location of the machine that executes the data consumption process (e.g., the location of the server of the data consumer, which processes the data). Additionally, or alternatively, the geographic location may be based on the legal location of the entity operating the data consumption process. For example, a Chinese company may be restricted from gaining access to a USA-exclusive data even if the Chinese company is using a served located in the USA.

In some exemplary embodiments, the PCA module may be coupled to or be in communication with a Privacy Portal configured for receiving and managing privacy preferences relating to a data subject. In some exemplary embodiments, the Privacy Portal may enable the data subject to indicate her privacy preferences and update them at her will. The data subject may indicate via the Privacy Portal for what purposes the data may be used, and optionally which specific data processor are authorized to use the data for a specified purpose. Additionally or alternatively, the Privacy Portal may be used by other actors different than the data subject, such as a guardian thereof, an administrator of an organization of which the data subject is member, or the like. In some exemplary embodiments, a policy may be defined in the Privacy Portal and such policy may be applied to a set of users, who may selectively update their own policy. In some cases, the users may update the policy only to further restrict it and not to relax the policy. Additionally or alternatively, the user-defined policy may be limited by policy guidelines, such as preventing the policy from excluding the organization of the data subject from viewing the data. The Privacy Portal may be configured to store the privacy preferences, provide the preferences to participating entities, such as data providers or the like, and enable change of the preferences by the data subject or other actors having sufficient permissions, such as addition or deletion of purposes for which use of the data is permitted. The Privacy Portal may also manage laws and enterprise policies indicating how personal data may be used, including (but not limited to) whether input from the data subject should be obtained.

Another technical solution may be to encrypt the data itself with purpose-based keys. Such an encryption prevents the use of the data by unauthorized party, even if such party gained access to the data, such as through data leakage. The data may be encrypted using a key corresponding the purpose. In some cases, when conjunctive restrictions are applied, a compound key may be created based on the key corresponding the purpose and additional keys corresponding the additional one or more conjunctive restrictions. In some exemplary embodiments, if disjunctive restrictions are applied, the same data is encrypted using different keys. For example, using KeyA for purpose A and separately using KeyB for purpose B.

In some exemplary embodiments, the data may be encrypted in a manner that encoded the restrictions applied thereon, including the purpose-based restrictions. In some cases, a header of the data may be used to list the restrictions, such as indicate allowed purpose, allowed minimal score, allowed data consumer, allowed geographic location, or the like. The header may be used to determine whether a specific data consumer may be able to use the data for a specific purpose.

Yet another technical solution may be to employ protected processes, such as having protected memory regions. In some cases, Software Guard Extensions (SGX) by INTEL™ may be employed to allocate enclaves for the protected process, preventing access from hypervisor, operating system and other unauthorized third parties, even if such parties have unrestricted access to the machine executing the protected process. Additionally, or alternatively, TrustedZone by ARM™ may be employed to allocate trusted memory zone, access to which is restricted to the protected process. TrustedZone may prevent access from third-parties to the trusted memory zone regardless of their machine-level permissions.

In some exemplary embodiments, the protected process may be used to analyze the header of the encrypted data and provide a decryption key therefore, in case the data consumer should be given access thereto for performing a desired operation (e.g., depending on its purpose, certification, and the allowed purpose of the data). In some cases, the decryption key may be a unique key that is uniquely used for the encrypted data. The unique decryption key may be generated based on the decryption key of the authorized purpose, decryption keys of conjunctive restrictions, and an additional key, such as the key of the data producer that created the data. In such a case, the fact that the decryption key is available outside the protected process, where it is used for decryption of the encrypted data, does not adversely affect the access control. Specifically, the same decryption key cannot be used for other data items.

In some exemplary embodiments, the protected process may be in charge of performing the entire data processing of the data consumer, preventing leakage of the private data to unauthorized parties.

One technical effect of utilizing the disclosed subject matter is to provide data protection against unauthorized use that is attached to the data itself, preventing the data to be used by unauthorized parties, even if they gain access thereto. The distributed data itself is encrypted and unusable to any party that is not authorized by the PCA for the right purposes (and potentially adheres to additional conjunctive restrictions).

Another technical effect of utilizing the disclosed subject matter is to provide for a decentralized system that does not require a centralized server to perform most of the processing. Centralized systems for consent and policy enforcement may have performance bottlenecks and require trust in the central data store or authority. Such solution may be reasonable and appropriate for a single enterprise but may be problematic for sharing of data across different entities, such as occurs often in the IoT and with wearables. The disclosed subject matter provides a decentralized system where the restrictions are not stored in a central location, and there is no central processing bottleneck. Instead, processing of the heavy duty encryption-decryption operations may be performed on the system's agents themselves: data producers, when creating new data and setting purpose-based access restrictions thereto; and data consumers, when accessing the purpose-based restricted data. Such decentralization may increase overall throughput of the system and may obliviate potential bottlenecks.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Figure 1A:
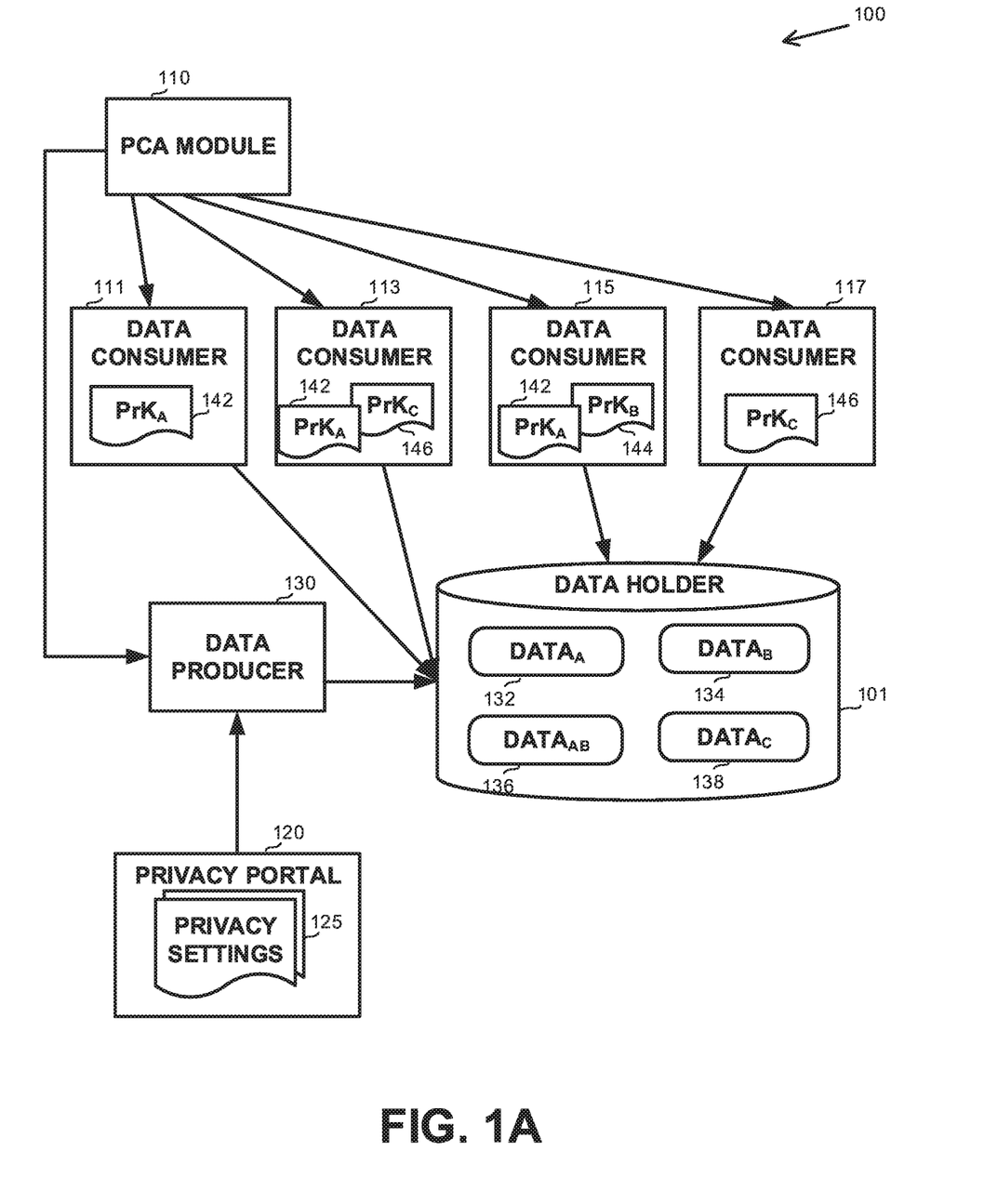
FIGS. 1A-1C show a schematic illustration of exemplary environments and architecture in which the disclosed subject matter may be utilized, in accordance with some exemplary embodiments of the disclosed subject matter.

Referring now to FIG. 1A showing a schematic illustration of an environment and architecture, in accordance with some exemplary embodiments of the disclosed subject matter.

Environment 100 may comprise a Data Holder 101 retaining data in accordance with the disclosed subject matter. Data Holder 101 may be a storage server, a network-associated storage device, a data center, a database, or the like.

Environment 100 may comprise a Purpose Certification Authority (PCA) Module 110 configured for certifying and enforcing compliance with authorized usage purposes, and a Privacy Portal 120 configured for receiving definitions and updates of authorized purposes and/or entities. PCA Module 110 may manage a registry of purposes, in accordance with a defined taxonomy, and a cryptosystem of respective public and private key pairs designated for the registered purposes. The taxonomy of purposes may be shared by PCA Module 110 with Privacy Portal 120 for ensuring overall consistency and compatibility thereamong. Privacy Portal 120 may receive the usage permissions from a subject of Data 109, or another user on the subject's behalf, or from privacy policies and retain them in Privacy Settings 125.

A Data Producer 130 may be an entity generating the data about the data subject. In some exemplary embodiments, Data Producer 130 may be an application tracking user-related information. Additionally, or alternatively, Data Producer 130 may be an IoT-based device monitoring information related to the data subject. Additional examples of data producers would be apparent to a person of ordinary skill in the art in view of the present disclosure. Data 131 (not shown in FIG. 1A) may be the raw version of the private data. Data Producer 130 may be configured to provide one or more encrypted versions of the data, each of which being encrypted using at least one purpose-related encryption keys. As an example, if Data 131 is made available for purpose A and purpose C, Data Producer 130 may provide $Data_A$ 132 and $Data_C$ 138. $Data_A$ 132 may be encrypted by a purpose-based encryption key associated with purpose A.

Data$_A$ 132 may be decryptable by data consumers being certified for purpose A and having access to the corresponding private key, PrK$_A$ 142, such as Data Consumers 111, 113, 115. Additionally, or alternatively, Data$_C$ 138 may be encrypted using a purpose-based encrypted key associated with purpose C and available to data consumers having access to PrK$_C$ 146, such as Data Consumers 113, 117.

In some exemplary embodiments, Data Producer 130 may provide the data with additional conjunctive restrictions, such as but not limited to restriction on a specific identity of the data consumer, a restriction on a score of the data consumer using the information, a restriction on geographical location of the data consumer, or the like. In some exemplary embodiments, the score may be a score indicative of the data consumer's compliance with general privacy regulations or standards. Additionally, or alternatively, the score may be a score given by the PCA based on examination on the use of data by the data consumer. For example, FACEBOOK™ might receive a relatively low score for sharing information with governments (in accordance with their privacy policy and terms of use), while TELEGRAM™ may receive a relatively high score due to avoiding sharing information with any third parties. For example, if additional restrictive requirement B is provided, the data may be encrypted using the key corresponding restrictive requirement alone (Data$_B$ 134) or using the purpose-based key together with the restrictive requirement key (Data$_{AB}$ 136).

Environment 100 may comprise one or more entities that may be interested in using Data 131, such as Data Consumers 111, 113, 115 and 117. Data Consumers 111, 113, 115, 117 may also be referred to as service providers as they may utilize the data and process it in order to provide a service. The PCA may certify each of Data Consumers 111, 113, 115, 117 to one or more purposes, and have PCA module 110 provide them with each of the respective private keys according to the certified purposes thereof and adherence to other restrictive requirements, accordingly, such as PrK$_X$ 142 for purpose A and PrK$_C$ 146 for purpose C. In the illustrated example, Data Consumer 111 may be certified for purpose A and granted PrK$_A$ 142, Data Consumer 113 may be certified for both purpose A and purpose C and granted PrK$_A$ 142 and PrK$_C$ 146, Data Consumer 115 may be certified for purpose A and may adhere to restrictive requirement B and granted PrK$_A$ 142 and PrK$_B$ 144, and Data Consumer 117 may be certified for purpose C and granted PrK$_C$ 146.

Data Consumers 111, 113, 115, 117 may be granted access to Data Holder 101, or otherwise may be given access to the encrypted versions of the data (e.g., Data$_A$ 132, Data$_B$ 134, Data$_C$ 136, Data$_D$ 138).

In some exemplary embodiments, the public keys used to encrypt the data may be generally available, such as accessible via PCA Module 110, retained on the Data Holder 101, published on the Internet, or the like. As an example, Data Producer 130 may request relevant public keys from PCA Module 110 when data is to be encrypted. The requested keys may be based on the Privacy Settings 125 associated with the data subject, the Data Producer 130, or the like.

Privacy Portal 120 may provide an indication of purposes for which usage of the data is permitted, as specified in Privacy Settings 125. Data Producer 130 interested in providing data to be used in accordance with the Privacy Settings 125, may encrypt the data using the relevant keys, indicating specific usage purposes and/or conjunctive restrictions.

When a data consumer wishes to utilize data, it may attempt to obtain it. For example, Data Consumer 111 being certified for purpose A, has access to PrK$_A$ 142. Data Consumer 111 may utilize PrK$_A$ 142 to decrypt Data$_A$ 132 to gain access to the data. However, Data Consumer 111 may be unable to gain access to the data if Data$_A$ 132 is not available, such as if only Data$_{AB}$ 136 or Data$_C$ 138 are available. In some exemplary embodiments, the information regarding which keys (e.g., purposes, conjunctive restrictions, or the like) are required in order to access the data, may be provided in an unencrypted form in the header of the data. By providing such information, computation resources may be spared, as there may not be a need to attempt decryption if the relevant keys are not available.

Figure 1B:
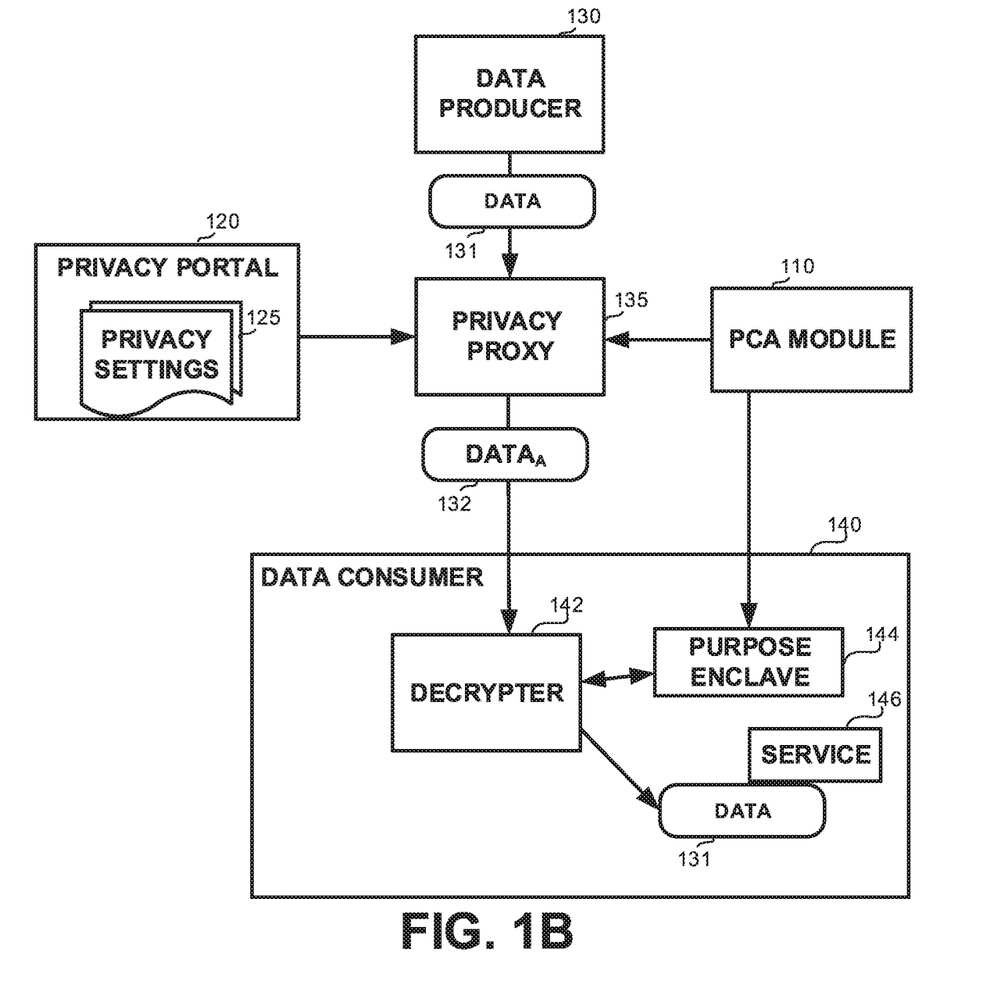

Referring now to FIG. 1B, showing a schematic illustration of an environment and architecture, in accordance with some exemplary embodiments of the disclosed subject matter.

Data Producer 130 is configured to produce raw data, Data 131. Privacy Proxy 135 may be configured to create copies of Data 131 that have purpose-based permissions access control embedded therein. The same data may be duplicated several times, for different access permissions. In the illustrated example, Data 131 is provided as authorized for purpose A only (Data$_A$ 132). Privacy Proxy 135 may determine which replicas of the data to create, based on Privacy Settings 125 provided and defied through Privacy Portal 120. Additionally or alternatively, the relevant encryption keys may be provided to Privacy Proxy 135 from a centralized location, such as publically published over the Internet, published by PCA Module 110, or the like.

In some exemplary embodiments, Privacy Proxy 135 may be implemented on the machine generating the data and executing Data Producer 130. In some exemplary embodiments, a same computer may execute Data Producer 130 to produce the raw data (131) as well as to execute Privacy Proxy 135 to generate an access-restricted version thereof (135). In some exemplary embodiments, Privacy Proxy 135 may be implemented as part of an outgoing communication module of a computer, such as implemented in a driver invoked by the operating system. Privacy Proxy 135 may be invoked to encrypt data as it is being transmitted from the computer to external computers, to ensure other parties would not gain access to the data unless they are properly authorized. Additionally or alternatively, Privacy Proxy 135 may be implemented on a different machine, such as a gateway through which the data is transmitted to third parties, so as to allow Data Producer 130 to use the data as is using its raw form (131), and ensuring third-parties are restricted from using it unless they are correctly authorized.

Data Consumer 140, such as 111, 113, 115, 117 of FIG. 1A, may be implement a Service 146 wishing to use Data 131, such as for processing purposes. Data Consumer 140 may receive the data in its protected form, e.g., Data$_A$ 132. A Decrypter 142 may be configured to decrypt the data (Data$_A$ 132) Decrypter 142 may provide Purpose Enclave 144 with the header of Data$_A$ 132. Purpose Enclave 144 may be configured to obtain the decryption key(s) from PCA Module 110, if Data Consumer is so authorized. Purpose Enclave 144 may return the key(s) to Decrypter 142 who may subsequently decrypt the Data$_A$ 132 to obtain Data 131. Data 131 may then be used and processed by Service 146.

In some exemplary embodiments, Purpose Enclave 144 may be executed by a protected process, such as implemented using enclaves using SGX or a trusted memory zone. As the Purpose Enclave 144 analyzes the header of the encrypted data, Data$_A$ 132, it may be used to ensure that even if Data Consumer 140 is authorized for several purposes, it would not breach privacy by using permission keys of other services executed thereon (not shown) to provide data to Service 146. Consider for example, that Data Consumer 140 may implement two services, Service 146 associated with purpose B and another service (not shown) associated with purpose A. As the other service is certified for purpose A, Data Consumer 140 may decrypt $Data_A$ 132. However, such decryption should be limited only to a case where the data is to be provided to the other service and not for Service 146. Executing a protected service may ensure the key is returned only for authorized services, and only when the header of the data indeed requires it.

Figure 1C:
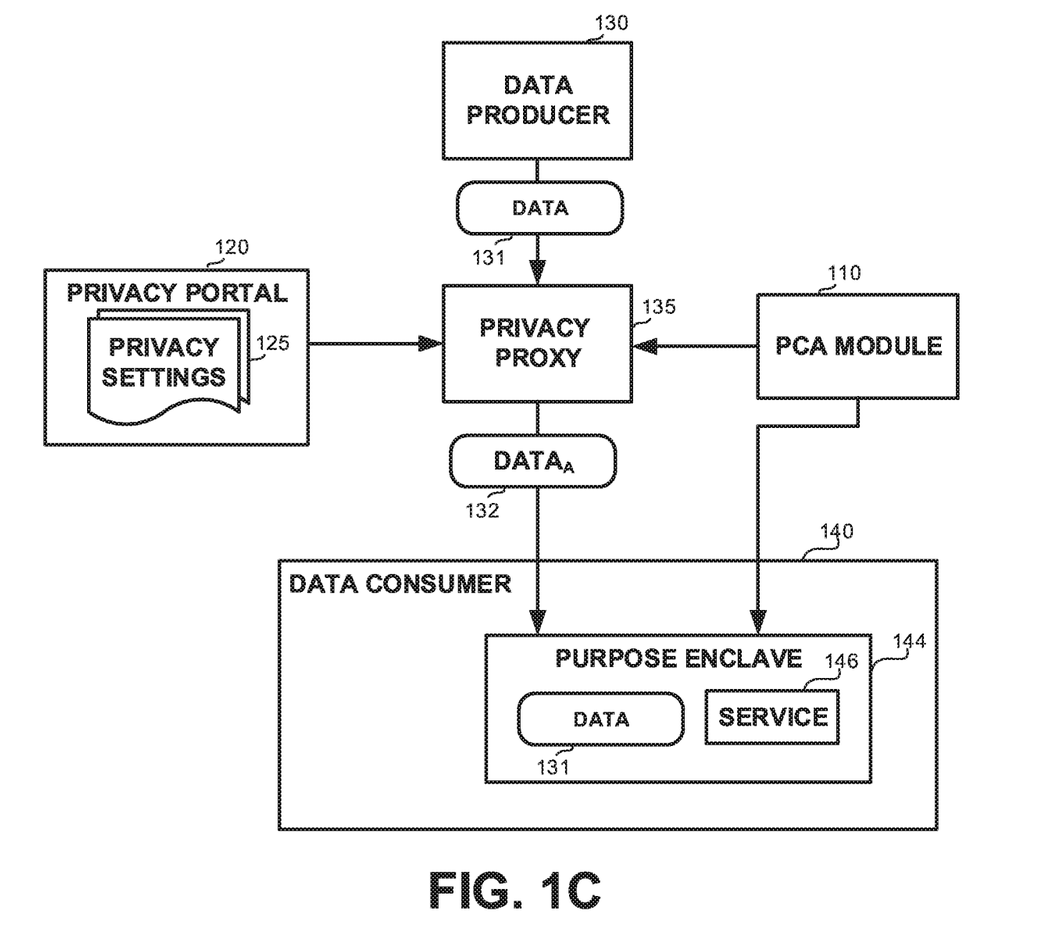

Referring now to FIG. 1C, depicting an alternative architecture, in accordance with some exemplary embodiments of the disclosed subject matter.

Data Consumer 140 is implemented in a manner in which Service 146 is executed as a protected process (e.g., Purpose Enclave 144). Such implementation ensures that Data 131 is only viewable and useable to Service 146, and not to other processes executed by Data Consumer 140. Data 131 is also unavailable to kernel processes, operating system of Data Consumer 140, hypervisor, or the like. Such a solution may also ensure that Data 131 would not leak even if Service 146 is executed on hardware owned and operated by third-parties.

Figure 2:
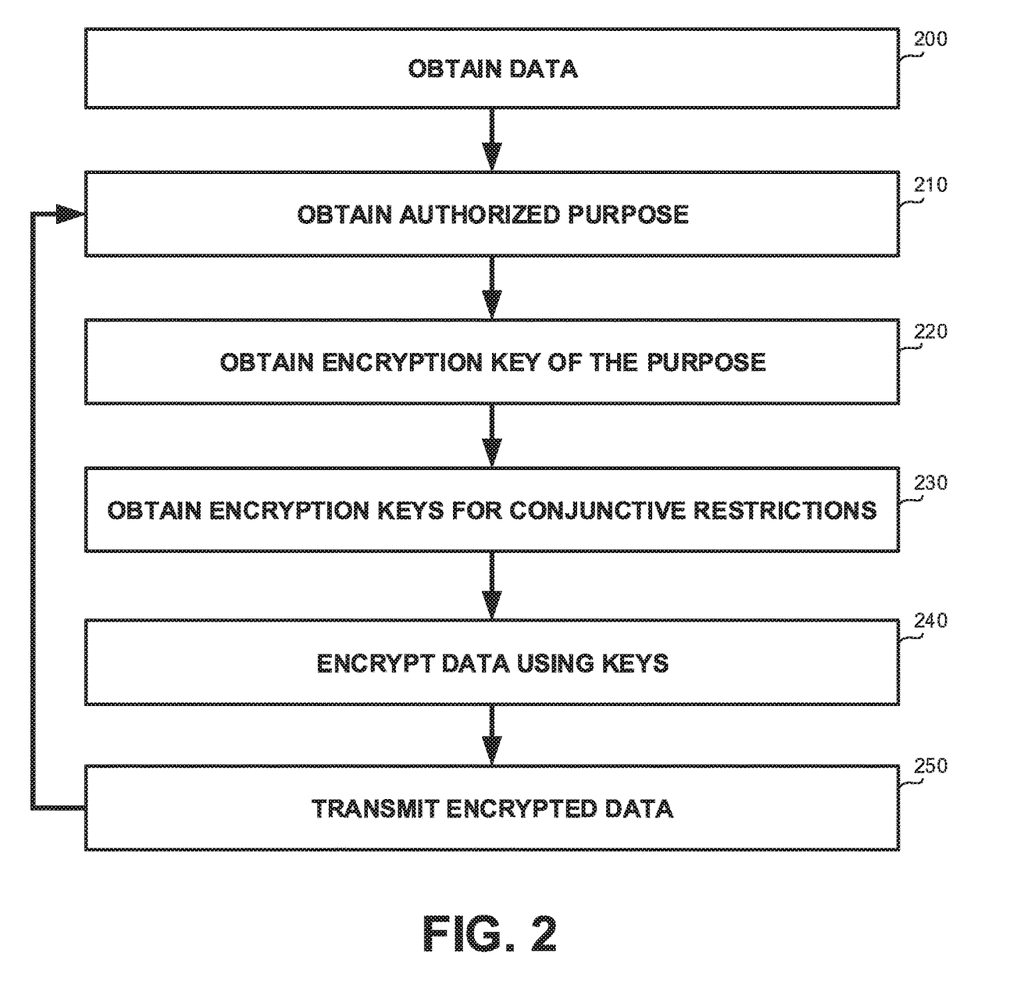
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, data is obtained. The data may be data about a subject. The data may be obtained from monitoring the data subject, from analyzing information related thereof, or the like. In some exemplary embodiments, the data may be obtained from a wearable device worn by the data subject, from a user device carried or used by the data subject, from an IoT device monitoring the data subject or her surroundings, or the like. The data may be obtained and may preferably be usable for some purposes.

On Step 210, a set of authorized purposes may be obtained. In some exemplary embodiments, the authorized purpose may be obtained from a privacy portal. The authorized purpose may be set based on the type of data, the origin of the data, to subject of the data, or the like. In some exemplary embodiments, there may be a plurality of authorized purposes. Each purpose may be processed individually on Steps 210-250.

On Step 220, an encryption key of the purpose may be obtained. The encryption key may be a public key of the purpose that is published. Additionally or alternatively, the encryption key may be obtained from a PCA module, such as 110 of FIG. 1A.

On Step 230, additional encryption keys may be obtained, such as encryption keys associated with one or more conjunctive restrictions to be applied on the use of the data. The conjunctive restrictions to be applied on the data may be determined based on the privacy settings, such as 125 of FIG. 1A.

On Step 240, the data may be encrypted using the keys obtained in Steps 220-230. In some exemplary embodiments, a compound key may be created using the several keys and used for encrypting the data in a single operation. Additionally or alternatively, the data may be encrypted using a first key and thereafter the outcome may be encrypted using a second key, and so forth. Additionally or alternatively, the data may be encrypted using a purpose-based key and thereafter encrypted using one or more keys associated with conjunctive restrictions.

In some exemplary embodiments, Steps 220-240 may be performed iteratively, where one key is obtained (e.g., in Step 220 or 230) and used for encryption (e.g., in Step 240), thereafter another key is obtained (e.g., in Step 220 or 230) and used for further encryption (e.g., in Step 240), and so forth.

On Step 250, the encrypted data may be transmitted or otherwise may be made available to other parties. The encrypted data itself may be transmitted to third parties, enabling the use of the raw data to data consumers having access to the relevant decryption keys, such as in view of being certified for the relevant purpose and having properties that adhere to the conjunctive restrictions.

Figure 3:
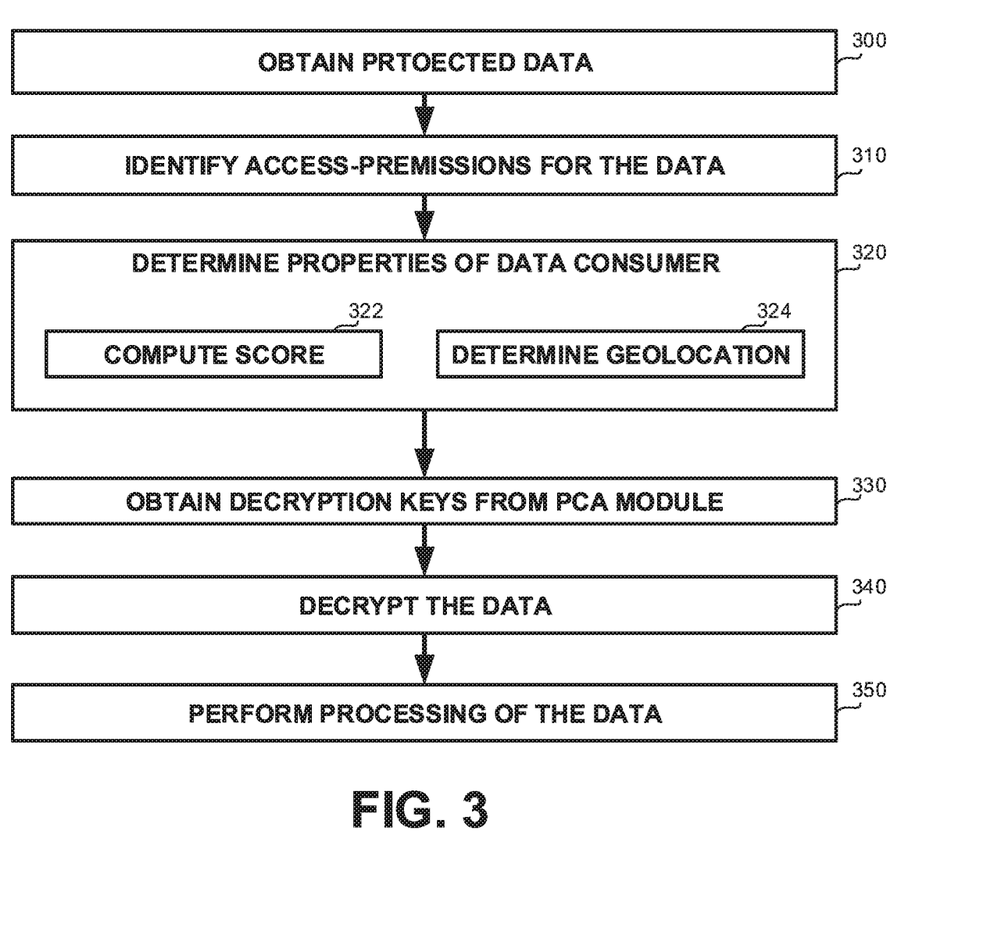
FIG. 3 shows a flowchart diagram of a method, in accordance with some exemplary embodiments of the disclosed subject matter.

Referring now to Figure c showing a flowchart diagram of a method, in accordance with some exemplary embodiments of the disclosed subject matter.

On Step 300, protected data may be obtained. The protected data may be encrypted using purpose-based keys and/or keys associated with conjunctive restrictions. The protected data, such as 132 of FIG. 1A, may comprise an unencrypted header indicating the authorized purpose thereof and/or conjunctive restrictions applied thereto.

On Step 310, the access-permissions to the data may be determined. The access-permissions may be determined based on the header of the data. Additionally or alternatively, access-permissions may be determined implicitly by attempting to decrypt the protected data using keys available to the data consumer performing the method of FIG. 3.

On Step 320, properties of the data consumer may be determined. The properties may be determined on the fly or may be a-priori determined. The properties may relate to potential conjunctive restrictions. Additionally or alternatively, only in case a conjunctive restriction is relevant for the data, the relevant property may be determined. In some exemplary embodiments, the property may indicate the identity of the data consumer, a geolocation thereof, a privacy score, or the like. On Sub-Step 322, a score for the data consumer may be computed. In some cases, the score may be provided manually. Additionally or alternatively, the score may be computed automatically, such as based on monitored compliance with a general privacy policy (which may be stricter than that of the data consumer performing the steps of FIG. 3). On Sub-Step 324, a geolocation of the data consumer may be determined, such as based on a GPS reading, based on a geolocation of the IP address used thereby, or the like. Additionally or alternatively, the geolocation may be determined based on legal documents such as incorporation documents of the entity operating the data consumer, or the like.

On Step 330, one or more decryption keys may be obtained. The decryption keys may be obtained from a PCA module, such as 110 of FIG. 1. The decryption keys may be initially obtained from the PCA module and retained locally by the data consumer. Additionally, or alternatively, the decryption keys may be obtained on-demand, when required to be used. The obtained decryption keys may be keys associated with the access-permissions of the data, such as certified purpose, certified score, certified identity, certified geolocation, or the like.

On Step 340, the encrypted data may be decrypted to obtain the data.

On Step 350, the data may be processed, such as by Service 146 of FIG. 1B. The data may be used for processing related to the authorized purpose. In some exemplary embodiments, the PCA may certify the service provider by examining its code and ensuring that the code that accesses the data while stating a specific purpose indeed limits itself to utilizing the data only for that specific purpose.

In some exemplary embodiments, Steps 310-350 may be performed by a protected process, such as exemplified in FIG. 1C. Additionally or alternatively, Steps 310-330 may be performed by a protected process, such as exemplified in FIG. 1B.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
  having data of a subject, wherein an approval for usage of the data for a purpose is provided, wherein the approval for the usage of the data for the purpose is restricted by a conjunctive restriction;
  obtaining an encryption key associated with the purpose, wherein a decryption key is required for decrypting information encrypted with the encryption key;
  encrypting the data using the encryption key to obtain an intermediate data, wherein said encrypting the data comprises encrypting the intermediate data using a second encryption key that is associated with the conjunctive restriction, wherein a second decryption key is required for decrypting information encrypted with the second encryption key, whereby obtaining purpose-based encrypted data that is encoded with the purpose for which the data can be used; and
  enabling access to the purpose-based encrypted data to one or more data consumers, wherein the second encryption key is restrictedly available to data consumer adhering to the conjunctive restriction, whereby access to the data is obtainable by decrypting the purpose-based encrypted data using the decryption key that is available to data consumers that are certified for the purpose together with the second decryption key that is available to the data consumers that adhere to the conjunctive restriction.

2. The method of claim 1, wherein an approval for usage of the data for a second purpose is provided, wherein said method further comprises:
  obtaining a third encryption key associated with the second purpose, wherein a third decryption key is required for decrypting information encrypted with the third encryption key;
  encrypting the data using the third encryption key, whereby obtaining a second purpose-based encrypted data that is encoded with the second purpose for which the data can be used;
  enabling access to the second purpose-based encrypted data to the one or more data consumers, whereby access to the data is obtainable by decrypting the purpose-based encrypted data using the decryption key that is available to data consumers that are certified for the purpose together with the second decryption key, or by decrypting the second-purpose-based encrypted data using the third decryption key that is available to data consumers that are certified for the second purpose.

3. The method of claim 1, wherein the conjunctive restriction is an identity of an authorized service provider, whereby only the authorized service provider is able to access the data and only for using the data for the purpose.

4. The method of claim 1, wherein the conjunctive restriction is one of:
  a restriction on a minimal threshold score of a service provider using the data; and
  a restriction on a geographic location of a service provider using the data.

5. The method of claim 1, wherein said enabling comprises at least one of:
  retaining the purpose-based encrypted data on a data storage accessible to the one or more data consumers; and
  transmitting the purpose-based encrypted data to the one or more data consumers.

6. The method of claim 1, wherein distribution of the decryption key to one or more data consumers is performed by a Purpose Certification Authority (PCA) module and is restricted to data consumers that have been certified by the PCA for using data for the purpose.

7. The method of claim 1, wherein the approval for usage of the data for a first purpose is provided by the subject or per policy.

8. The method of claim 1, wherein said encrypting further comprises:
  encoding in a header of the purpose-based encrypted data an identifier of the purpose, whereby enabling a data consumer to determine whether the data consumer is authorized to utilize the data based on an intended usage purpose.

9. A method comprising:
  obtaining a purpose-based encrypted data that encrypts data of a subject, wherein the purpose-based encrypted data is encrypted using an encryption key associated with a purpose, wherein the purpose-based encrypted data is encrypted using a second encryption key that is associated with a conjunctive restriction, wherein an approval for usage of the data for the purpose is provided, wherein the approval for the usage of the data for the purpose is restricted by the conjunctive restriction;
  decrypting the purpose-based encrypted data using a decryption key that is associated with the purpose, wherein the decryption key is useable for decrypting information encrypted with the encryption key, wherein said decrypting comprises decrypting the purpose-based encrypted data using a second decryption key that is useable for decrypting information encrypted with the second encryption key, whereby obtaining the data; and
  using the data by a data consumer, wherein the data consumer adheres to the conjunctive restriction, wherein the data consumer is certified for the purpose.

10. The method of claim 9, wherein said decrypting is performed within a protected process, wherein access to a memory region of the protected process is restricted from other processes, whereby preventing access to the decryption key to other processes.

11. The method of claim 10, wherein said using the data is performed within the protected process.

12. The method of claim 10, wherein said decrypting comprises:
   providing a header of the purpose-based encrypted data to the protected process, wherein the header comprises an indication of at least one of the purpose, the data consumer, and the conjunctive restriction; and
   receiving from the protected process, the decryption key; and
   wherein said using the data is performed externally to the protected process.

13. A computerized apparatus having a processor and coupled memory, the processor being adapted to perform:
   having data of a subject, wherein an approval for usage of the data for a purpose is provided, wherein the approval for the usage of the data for the purpose is restricted by a conjunctive restriction;
   obtaining an encryption key associated with the purpose, wherein a decryption key is required for decrypting information encrypted with the encryption key;
   encrypting the data using the encryption key to obtain an intermediate data, wherein said encrypting the data comprises encrypting the intermediate data using a second encryption key that is associated with the conjunctive restriction, wherein a second decryption key is required for decrypting information encrypted with the second encryption key, whereby obtaining purpose-based encrypted data that is encoded with the purpose for which the data can be used; and
   enabling access to the purpose-based encrypted data to one or more data consumers, wherein the second decryption key is restrictedly available to data consumers adhering to the conjunctive restriction, whereby access to the data is obtainable by decrypting the purpose-based encrypted data using the decryption key that is available to data consumers that are certified for the purpose together with the second decryption key that is available to the data consumers that adhere to the conjunctive restriction.

14. The computerized apparatus of claim 13, wherein an approval for usage of the data for a second purpose is provided, wherein the program instructions further cause the processor to perform:
   obtaining a third encryption key associated with the second purpose, wherein a third decryption key is required for decrypting information encrypted with the third encryption key;
   encrypting the data using the third encryption key, whereby obtaining a second purpose-based encrypted data that is encoded with the second purpose for which the data can be used;
   enabling access to the second purpose-based encrypted data to the one or more data consumers, whereby access to the data is obtainable by decrypting the purpose-based encrypted data using the decryption key that is available to data consumers that are certified for the purpose together with the second decryption key, or by decrypting the second-purpose-based encrypted data using the third decryption key that is available to data consumers that are certified for the second purpose.

15. The computerized apparatus of claim 13, wherein the conjunctive restriction is one of:
   an identity of an authorized service provider;
   a restriction on a minimal threshold score of a service provider using the data; and
   a restriction on a geographic location of a service provider using the data.

16. The computerized apparatus of claim 13, wherein said enabling comprises at least one of:
   retaining the purpose-based encrypted data on a data storage accessible to the one or more data consumers; and
   transmitting the purpose-based encrypted data to the one or more data consumers.

17. The computerized apparatus of claim 13, wherein distribution of the decryption key to one or more data consumers is performed by a Purpose Certification Authority (PCA) module and is restricted to data consumers that have been certified by the PCA for using data for the purpose.

18. The computerized apparatus of claim 13, wherein said encrypting further comprises:
   encoding in a header of the purpose-based encrypted data an identifier of the purpose, whereby enabling a data consumer to determine whether the data consumer is authorized to utilize the data based on an intended usage purpose.

* * * * *